CIRCUIT ARRANGEMENT FOR PRODUCING A VOLTAGE RESPONSIVE
TO THE PHASE OF TWO VOLTAGES TO BE COMPARED
Filed Jan. 23, 1958
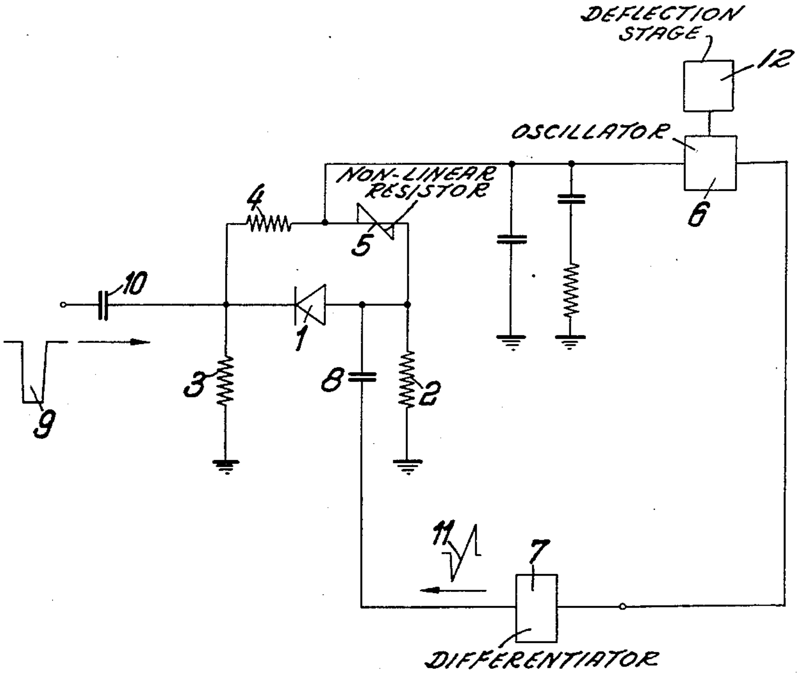
Inventor:
Alfred Pollak
By Erich D. Frankel
Patent Agent 2,933,624

CIRCUIT ARRANGEMENT FOR PRODUCING A VOLTAGE RESPONSIVE TO THE PHASE OF TWO VOLTAGES TO BE COMPARED

Alfred Pollak, Hannover-Ricklingen, Germany, assignor to Telefunken G.m.b.H., Berlin, Germany Application January 23, 1958, Serial No. 710,794

Claims priority, application Germany February 14, 1957

4 Claims. (Cl. 307—88.5)

The invention relates to a circuit arrangement for producing an A.V.C. voltage responsive to the phase of two voltages to be compared, preferably for line synchronisation in television receivers.

For this purpose it is known to employ a one-diode circuit in which both the reference pulse derived from the oscillator and the balanced or differentiated synchronising pulse are fed to the diode cathode. The A.V.C. voltage obtained by peak-rectifying the sum voltage is a measure of the phase of the two pulses, since the balanced synchronising pulse is a double-sided pulse, comprising equal positive and negative components. However, this relatively simple circuit has the disadvantage that the A.V.C. voltage is substantially affected by interference pulses. Such a disadvantage is overcome by using a balanced phase discriminating circuit in which synchronising pulses are symmetrically applied to a two-rectifier bridge via a push-pull transformer. Without the addition of a reference voltage every input pulse, therefore every interference pulse too, is eliminated in this bridge circuit. When, however, differentiated pulses comprising equal positive and negative components are derived from the output line stage, for example, and applied to the centre tap of the push-pull transformer, the bridge balance is upset and there is set up an input bridge voltage which is positive or negative according to the phase of the pulses to be compared. Such discriminators however are relatively expensive on account of the push-pull transformer and the two diodes. The object of the invention is to reduce the cost of conventional phase comparison circuits.

According to the invention, this is achieved by parallel-connecting the series circuit of a fixed resistor and a non-linear resistor, from the junction of which the A.V.C. voltage is derived, to the diode of a one-diode phase comparison circuit, to the cathode and/or the anode of which are fed the pulses to be compared, said connection being so arranged that for phase coincidence the A.V.C. voltage is zero and for phase difference in either direction the A.V.C. voltage is either positive of negative. Thereby a bridge circuit is obtained, which needs no balanced input pulses, no push-pull transformer, but only one diode.

In order that the present invention may be clearly understood and readily carried into effect, the same will be described with reference to the accompanying drawing. The drawing represents a phase comparison circuit comprising a diode 1 having its anode grounded via the resistor 2 and its cathode grounded via the resistor 3. Parallel to the diode 1 there is connected a series circuit comprising a resistor 4 and a non-linear resistor 5, the junction of said resistors being connected to the oscillator 6 to be controlled. The frequency generated by this oscillator 6, or the pulse voltage derived from the output deflecting stage 12, is fed to the anode of the diode 1 via a differentiating member 7 and a capacitor 8. Synchronising pulses 9 derived from the received composite television signal or the like are applied with negative polarity to the cathode of the diode 1 via a capacitor 10. The bridge circuit 1, 2, 3, 4, 5 described so far delivers an A.V.C. voltage having a zero value when there is phase coincidence between synchronising pulses 9 and differentiated pulses 11 or when there are no reference pulses, because no voltage appears across the diode 1 and, therefore, no voltage appears across the resistances 4 and 5, the bridge being thus balanced. As soon, however, as there is no longer phase coincidence between said pulses, current is caused to flow through the resistances 4 and 5. However, it is important to note that the current flowing therethrough is higher, if the voltage applied through the condenser 10 is more positive than the voltage applied through the condenser 8 because, in this case, the diode is non-conductive. If the diode is rendered conductive by the voltage applied through the condenser 8 going more positive than the voltage applied through the condenser 10, the diode 1 is rendered conductive and, therefore, tends to short-circuit the resistors 4 and 5. Thus, in these two cases, a higher or a lower current flows through the non-linear resistor causing the value thereof to be varied and consequently shifting the bridge circuit comprising resistors 2, 3, 4, 5 out of symmetry. At the junction of resistors 4 and 5 there is set up an A.V.C. voltage which is varied in polarity and in value, depending on the direction of the phase difference and on how far the pulses to be compared are out of phase.

I claim:

1. A circuit arrangement for producing a voltage responsive to the phase of two voltages to be compared, comprising a series circuit of a fixed resistor and a non-linear resistor, means connected to the junction of the fixed resistor and non-linear resistor for connecting said junction to external devices, a diode connected in parallel with said series circuit, said diode having the pulses to be compared fed individually to its cathode and its anode a second series circuit comprising a second and a third fixed resistor connected in parallel with said diode and said fixed and non-linear resistor to form a bridge circuit, and means connected to the junction of said second and third fixed resistors for connecting that junction to external devices in cooperation with the means for connecting the junction of said fixed resistor and said non-linear resistor, the feeding of pulses to be compared to said diode being so arranged that for phase coincidence the voltage appearing across the junction of said fixed resistor and non-linear resistor and the junction of said second and third fixed resistors has a zero value and for phase difference in either direction the voltage has a positive or a negative value.

2. Apparatus for developing voltages indicative of the differences in phase between two electrical signals, said apparatus comprising a bridge circuit comprising a first, a second, and a third fixed resistor and a non-linear resistor, all connected at four bridge terminals to form a closed series; one end of said first fixed resistor being connected to one end of said non-linear resistor at a first terminal, and one end of each of said second and third fixed resistors being connected together at a second terminal; coupling means connecting two sources of electrical energy whose phases are to be compared to third and fourth terminals forming one diagonal of said bridge circuit; a diode connected between said third and fourth terminals; and means connected to the other diagonal of said bridge circuit for connecting the output from said bridge circuit to external devices.

3. The circuit defined in claim 2 wherein the connections of the sources of signals to be compared are made respectively between the anode and cathode of said diode and the second terminal as a common reference point, and wherein the diode is connected across the series circuit of said first resistor and said non-linear resistor, so that the current therethrough varies in polarity and amplitude, depending on the relative polarities and degree of phase coincidence of the two signals.

4. Apparatus for producing an electrical signal, the polarity of which denotes the direction of phase difference between two electrical signals to be compared, said apparatus comprising a bridge circuit comprising three fixed resistors and a non-linear resistor connected end-to-end in a ring, a diode, means for connecting the sources of electrical signals to be compared to the anode and cathode of said diode, means for connecting external devices to be controlled across one diagonal of said bridge, said one diagonal comprising on one side the junction between the non-linear resistor and a fixed resistor, and means for connecting the diode across the other diagonal of said bridge.

References Cited in the file of this patent

UNITED STATES PATENTS

| | | |
|---|---|---|
| 2,685,001 | Drake | July 27, 1954 |
| 2,827,573 | Eckert | Mar. 18, 1958 |